United States Patent
Lim et al.

(10) Patent No.: US 9,855,793 B2
(45) Date of Patent: Jan. 2, 2018

(54) SEALING STRUCTURE OF WHEEL BEARING FOR VEHICLE AND WHEEL BEARING PROVIDED WITH THE SAME

(71) Applicant: ILJIN GLOBAL CO., LTD., Seoul (KR)

(72) Inventors: Jong Keun Lim, Seoul (KR); Chae Young Cha, Seoul (KR)

(73) Assignee: ILJIN GLOBAL CO., LTD., Seoul (KR)

( * ) Notice: Subject to any disclaimer, the term of this patent is extended or adjusted under 35 U.S.C. 154(b) by 0 days.

(21) Appl. No.: 14/953,059

(22) Filed: Nov. 27, 2015

(65) Prior Publication Data

US 2016/0221391 A1 Aug. 4, 2016

(30) Foreign Application Priority Data

Jan. 30, 2015 (KR) ........................ 10-2015-0015451

(51) Int. Cl.
| | |
|---|---|
| *B60B 27/00* | (2006.01) |
| *F16C 33/80* | (2006.01) |
| *F16C 33/78* | (2006.01) |
| *F16J 15/34* | (2006.01) |
| *F16J 15/447* | (2006.01) |
| *F16J 15/3264* | (2016.01) |

(52) U.S. Cl.
CPC ........ *B60B 27/0073* (2013.01); *B60B 27/001* (2013.01); *F16C 33/7886* (2013.01); *F16C 33/805* (2013.01); *F16J 15/3264* (2013.01); *F16J 15/3456* (2013.01); *F16J 15/447* (2013.01); *B60B 2900/511* (2013.01); *F16C 2326/02* (2013.01)

(58) Field of Classification Search
CPC . B60B 27/0073; B60B 27/001; F16C 33/805; F16C 33/7886; F16J 15/3456; F16J 15/3264; F16J 15/447
See application file for complete search history.

(56) References Cited

U.S. PATENT DOCUMENTS

| | | | | |
|---|---|---|---|---|
| 9,403,405 | B2 * | 8/2016 | Barberis | ............... F16C 33/783 |
| 2009/0263063 | A1 | 10/2009 | Komori | |
| 2010/0129018 | A1 * | 5/2010 | Shigeoka | ............ B60B 27/0005 384/544 |
| 2013/0127119 | A1 * | 5/2013 | Haepp | ................ F16C 33/7863 277/351 |
| 2015/0003766 | A1 * | 1/2015 | Duch | ..................... F16C 19/04 384/480 |

(Continued)

FOREIGN PATENT DOCUMENTS

| | | |
|---|---|---|
| CN | 101883941 | 11/2010 |
| CN | 103210224 | 7/2013 |

(Continued)

OTHER PUBLICATIONS

SIPO, Office Action of CN 201510940412.8 dated Aug. 28, 2017.
DE, Office Action of DE 102015122596.4 dated Apr. 11, 2017.

*Primary Examiner* — Kip T Kotter
(74) *Attorney, Agent, or Firm* — Lex IP Meister, PLLC (57) ABSTRACT

A wheel bearing includes a hub provided with a flange; and an outer ring having an end close to the flange and the other end opposite to the end and relatively rotatable to the hub. A sealing structure for sealing the space between the flange and the end of the outer ring is further included.

14 Claims, 6 Drawing Sheets

(56) References Cited

U.S. PATENT DOCUMENTS

| | | | | |
|---|---|---|---|---|
| 2015/0063734 A1* | 3/2015 | Duch | ............... | F16C 33/7823 |
| | | | | 384/446 |
| 2015/0151573 A1* | 6/2015 | Shibayama | .......... | F16J 15/3264 |
| | | | | 277/351 |
| 2016/0003302 A1* | 1/2016 | Seno | .................. | F16J 15/3264 |
| | | | | 277/351 |
| 2016/0178010 A1* | 6/2016 | Kaiser | ................ | F16C 33/805 |
| | | | | 277/351 |
| 2016/0246340 A1* | 8/2016 | Campagna | ............. | F25B 21/04 |

FOREIGN PATENT DOCUMENTS

| | | |
|---|---|---|
| DE | 102013218635 | 3/2015 |
| EP | 2837507 | 3/2016 |
| JP | 2005-291485 | 10/2005 |
| JP | 2008-298106 | 12/2008 |
| JP | 2012-154374 | 8/2012 |
| JP | 2014-052070 | 3/2014 |
| KR | 10-2013-0098302 | 9/2013 |
| KR | 10-2014-0005546 | 1/2014 |
| KR | 10-2014-0007595 | 1/2014 |

\* cited by examiner

SEALING STRUCTURE OF WHEEL BEARING FOR VEHICLE AND WHEEL BEARING PROVIDED WITH THE SAME

CROSS-REFERENCE TO RELATED APPLICATION

This application claims priority to and the benefit of Korean Patent Application No. 10-2015-0015451 filed in the Korean Intellectual Property Office on Jan. 30, 2015, the entire contents of which are incorporated herein by reference.

BACKGROUND OF THE INVENTION (a) Field of the Invention

The present invention relates to a sealing structure of a wheel bearing for a vehicle. More particularly, the present invention relates to a sealing structure of a wheel bearing for a vehicle which is mounted between an outer ring and a flange of the wheel bearing for the vehicle and can prevent inflow of foreign materials, and the wheel bearing provided with the same.

(b) Description of the Related Art

Generally, a bearing is disposed between a rotating element and a non-rotating element so as to smooth rotation of the rotating element. Various types of bearings such as a ball bearing, a taper roller bearing, needle bearing, and so on are currently used.

A wheel bearing is one type of such bearings, and rotatably connects a wheel that is the rotating element to a vehicle body that is non-rotating element. The wheel bearing includes an inner ring (and/or a hub) connected to one of a wheel or a vehicle body, an outer ring connected to the other of the wheel or the vehicle body, and rolling elements disposed between the outer ring and the inner ring.

Since such the wheel bearing is mounted at the wheel of the vehicle, the wheel bearing is always exposed to foreign materials such as dust and moisture. If the foreign materials enter an inside of the wheel bearing, particularly a portion on which the rolling elements are mounted, raceways that are grinded may be damaged. The damaged raceways may generate noise and vibration when the wheel bearing operates and may shorten a lifetime of the wheel bearing. Therefore, sealing apparatus for preventing inflow of the foreign materials may be mounted at one end or both ends of the wheel bearing. Particularly, the sealing apparatus for sealing a space between the outer ring and the hub may be provided to the wheel bearing.

A conventional sealing apparatus includes an inner supporter, a sealing member, and a lip portion. In addition, the sealing apparatus may further include an outer supporter. The inner supporter is mounted on an exterior circumference of one end portion of the outer ring, the outer supporter is mounted on a flange and faces the inner supporter, and sealant is applied to a contacting surface of the outer supporter and the flange so as to seal a gap between the outer supporter and the flange. The lip portion includes a plurality of lips. Some lips contact with the outer supporter and seal a space between the inner supporter and the outer supporter. That is, the plurality of lips prevent inflow of the foreign materials into the sealing apparatus. The sealing member is integrally formed with the lip portion and mounted on the inner supporter.

The conventional sealing apparatus can prevent inflow of the foreign materials to some degree, but the foreign materials (dust or moisture) falling down on the flange may flow into the sealing apparatus.

In addition, a plurality of lips are configured to contact with the outer supporter in order to further prevent inflow of the foreign materials into the sealing apparatus, thereby increasing drag torque of the bearing.

Furthermore, the inflow foreign materials cannot flow out from the conventional sealing apparatus.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a sealing structure of a wheel bearing having advantages of blocking foreign materials falling down on a surface of a flange and easily dropping the foreign materials down to a ground by forming a staying recess at a radially outmost end of the outer supporter.

Another embodiment of the present invention provides a sealing structure of a wheel bearing having advantages of tapping the foreign materials by forming a pocket lip at an inside of the sealing apparatus and of sending the trapped foreign materials out from the sealing apparatus.

Yet another embodiment of the present invention provides a sealing structure of a wheel bearing having advantages of preventing inflow of foreign materials in an axial direction by mounting a blocking wall extending to a radial outer direction from an exterior circumference of an inner supporter.

A sealing structure of a wheel bearing which includes a hub provided with a flange and an outer ring having an end close to the flange and the other end opposite to the end and relatively rotatable to the hub is configured to seal a space between the flange and the end of the outer ring. The sealing structure may include: an inner supporter mounted at an end portion of the outer ring; an outer supporter having a flange contact portion mounted at a side surface of the flange; and a sealing member mounted on the inner supporter and having at least one seal lip contacting with the outer supporter, wherein at least a portion of the outer supporter at a radial exterior of the flange contact portion is spaced from the flange and forms a staying recess together with the flange.

The outer supporter spaced from the flange may be extended axially far away from the flange.

The sealing member may include a blocking wall spaced from an end of the outer supporter that is extended axially and extended radially further than the end of the outer supporter.

A surface of the blocking wall opposite to the end of the outer supporter may be formed of a slanted surface.

At least a portion of the outer supporter at a radial interior of the flange contact portion may be spaced from the flange and may be extended in an axially inboard direction and a radially inner direction.

In one aspect, the sealing structure may further include a pocket lip extended from the sealing member and having a pocket shape opening toward a radially outer direction.

An end of the pocket lip may be spaced from the outer supporter.

In another aspect, the sealing structure may further include a pocket lip extended slantly from the sealing member in a radially outer direction and contacting with the outer supporter.

The inner supporter may include: an axially extending portion press-fitted onto an exterior circumference of an end portion of the outer ring and extending axially; a radially extending portion bent from an end of the axially extending portion, extending in a radially inner direction, and contacting with the end of the outer ring, wherein the other end of the axially extending portion is spaced from an exterior circumference of the outer ring and is formed of a thin end portion.

The sealing structure may further include a slanted lip mounted at a radially inner end of the inner supporter and extending in a radially inner direction and an axially inboard direction.

The sealing structure may further include an extended portion enclosing a radially inner end of the inner supporter.

A wheel bearing according to another exemplary embodiment of the present invention may include: a hub provided with a flange; an outer ring having an end close to the flange and the other end opposite to the end and relatively rotatable to the hub; and a sealing apparatus configured to seal a space between the flange and the end of the outer ring.

The flange may include a flange base, a flange extended portion extended in a radially outer direction from the flange base, and a flange curved portion concave toward an axially outboard direction at a radial exterior of the flange base.

The sealing apparatus may include an inner supporter mounted at an end portion of the outer ring, an outer supporter having a flange contact portion, and a sealing member mounted on the inner supporter and having at least one seal lip contacting with the outer supporter, wherein at least a portion of the outer supporter contacts with the flange extended portion.

At least a portion of the outer supporter at a radial exterior of the flange contact portion may be spaced from the flange curved portion and may form a staying recess together with the flange curved portion.

Above-described sealing structure according to the exemplary embodiment of the present invention may be used in the wheel bearing according to another exemplary embodiment of the present invention with or without a suitable modification being applied.

As described above, since a staying recess is formed between a radially outmost end of an outer supporter and a flange and a blocking wall is mounted on an exterior circumference of an inner supporter, inflow of foreign materials may be effectively prevented according to an exemplary embodiment of the present invention. If the foreign materials flow into a sealing apparatus, the foreign materials are trapped in a pocket lip and flow out from the sealing apparatus again. Further, the sealing apparatus according to an exemplary embodiment of the present invention may improve sealing performance, and thereby achieving sufficient sealing purpose even though one seal lip contacts with the outer supporter. Therefore, drag torque of the bearing may be reduced and fuel economy may be improved.

DETAILED DESCRIPTION OF THE EMBODIMENTS

Exemplary embodiments of the present invention will hereinafter be described in detail with reference to the accompanying drawings.

In the specification, unless explicitly described to the contrary, the word "comprise" and variations such as "comprises" or "comprising", will be understood to imply the inclusion of stated elements but not the exclusion of any other elements.

For better comprehension and ease of description, a portion close to a wheel in an axial direction (the left in the drawings) will be called 'one side', 'one end', 'one end portion' or similar designations thereto, and a portion far from the wheel in the axial direction (the right in the drawings) will be called 'the other side', 'the other end', 'the other end portion' or similar designations thereto.

In the specification, the same or similar reference numerals refer to the same or similar constituent elements.

Figure 1:
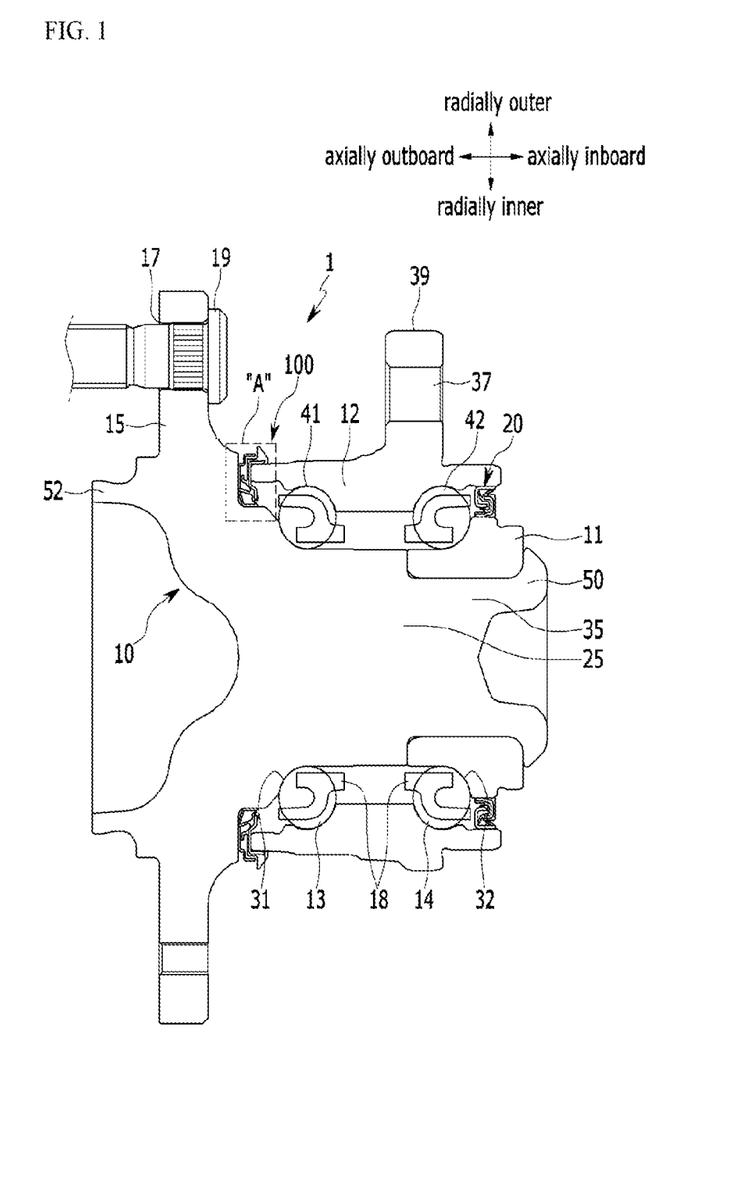
FIG. 1 is a cross-sectional view of a wheel bearing according to an exemplary embodiment of the present invention.

FIG. 1 is a cross-sectional view of a wheel bearing according to an exemplary embodiment of the present invention.

A wheel bearing illustrated in FIG. 1, for better comprehension and ease of description, exemplifies any one wheel bearing among various wheel bearings. Therefore, it is to be understood that spirit of the present invention is not limited to be applied to the wheel bearing exemplified in this specification but is applied to various wheel bearings.

As shown in FIG. 1, a wheel bearing 1 according to an exemplary embodiment of the present invention includes a hub 10, an inner ring 11 engaged on an exterior circumference of the hub 10, an outer ring 12 spaced radially apart from the hub 10 and the inner ring 11, first rolling elements 13 disposed between the hub 10 and the outer ring 12, second rolling elements 14 disposed between the outer ring 12 and the inner ring 11, and a sealing apparatus 100 and an inboard seal 20 disposed between the hub 10 (or the inner ring 11) and the outer ring 12.

The hub 10 includes a flange 15 of disk shape extending in a radially outer direction at a side portion thereof, a middle portion 25 of cylindrical shape extending toward the other side from the flange 15, and an inner ring receiving portion 35 formed at an exterior circumference of the other side portion of the hub 10 and stepped in a radially inner direction. A bolt hole 17 is formed at the flange 15 and a hub bolt 19 is fixedly mounted in the bolt hole 17. A vehicle wheel (not shown) is mounted at the hub bolt 19. In addition, a pilot 52 is protruded from a side surface of the hub 10 in an axial direction. The pilot 52 guides the wheel when the wheel is mounted at the flange 15. The hub 10 further includes a hub raceway 31 formed at an exterior circumference thereof between the flange 15 and the middle portion 25. In addition, a bending portion 50 is formed at the other end of the hub 10 so as to hold the inner ring 11 mounted on the hub 10 and apply preload to the rolling elements.

The inner ring 11 has a cylindrical shape and is press-fitted onto the inner ring receiving portion 35 of the hub 10. An inner ring raceway 32 is formed on an exterior circumference of the inner ring 11.

The outer ring 12 has a hollow cylindrical shape and encloses the exterior circumference of the hub 10. That is, a hollow space is formed in a radially inner portion of the outer ring 12 along a center axis, and the hub 10 and the inner ring 11 are insert in the hollow space. An outer ring flange 39 is extended from an exterior circumference of the outer ring 12 in the radially outer direction, and an outer ring bolt hole 37 for mounting the wheel bearing 1 to a vehicle body (particularly, a knuckle) is formed at the outer ring flange 39. In addition, first and second outer ring raceways 41 and 42 are formed respectively on interior circumferences of both end portions of the outer ring 12. The first outer ring raceway 41 formed on the interior circumference of the end portion of the outer ring 12 faces the hub raceway 31. In addition, the second outer ring raceway 42 formed on the interior circumference of the other end portion of the outer ring 12 faces the inner ring raceway 32.

The first rolling elements 13 are mounted between the hub raceway 31 and the first outer ring raceway 41 and the second rolling elements 14 are mounted between the inner ring raceway 32 and the second outer ring raceway 42. The first rolling elements 13 and the second rolling elements 14 have various shapes such as a ball shape or a cylinder shape. A predetermined distance is maintained between one rolling element included in the first rolling elements 13 or the second rolling elements 14 and another neighboring rolling element by a retainer 18.

The inboard seal 20 is mounted at the other end portion of the outer ring 12. The inboard seal 20 closes a radial space formed between the outer ring 12 and the inner ring 11 so as to prevent inflow of foreign materials (dust or moisture) into the radial space between the outer ring 12 and the ring 11.

The sealing apparatus 100 is mounted at the end portion of the outer ring 12 so as to prevent inflow of foreign materials into a space between the outer ring 12 and the hub 10. The sealing apparatus 100 will be described in further detail with reference to FIG. 2.

Figure 2:
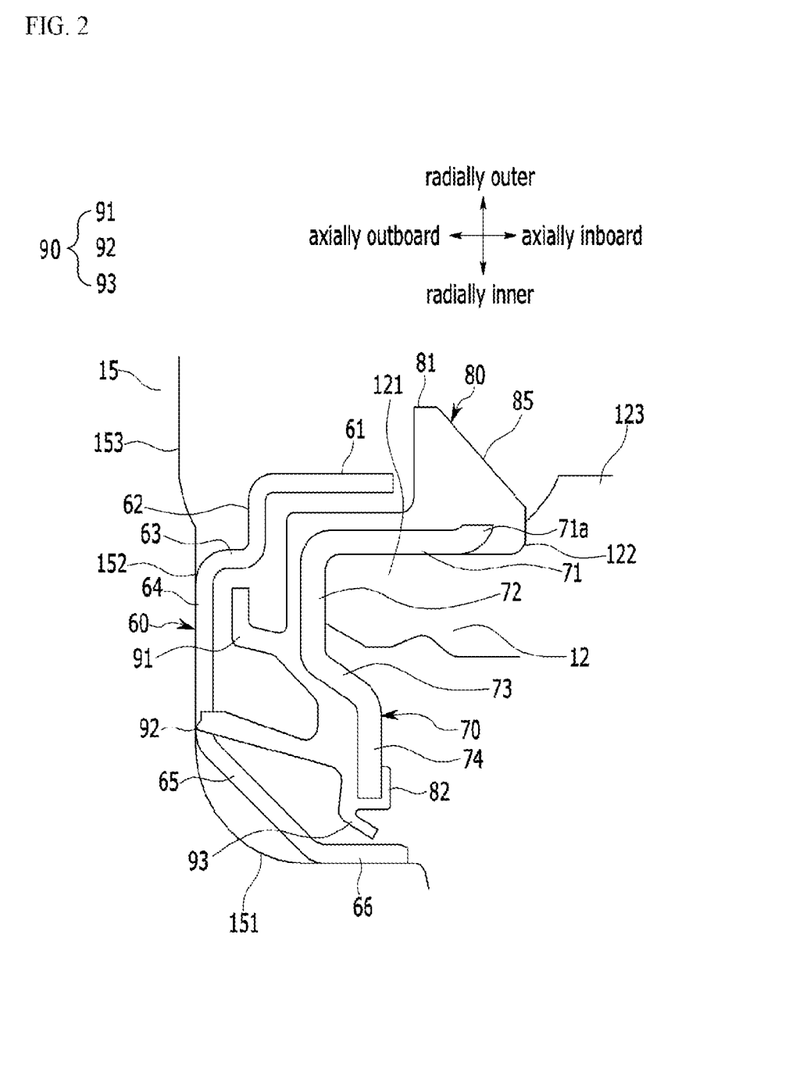
FIG. 2 is an enlarged view of "A" portion in FIG. 1 and a cross-sectional view of a sealing structure of a wheel bearing according to an exemplary embodiment of the present invention.

FIG. 2 is an enlarged view of "A" portion in FIG. 1.

As shown in FIG. 2, a wheel bearing sealing apparatus 100 according to an exemplary embodiment of the present invention is mounted between the end portion of the outer ring 12 and the flange 15. The flange 15 includes a flange base 151 connected to the hub raceway 31 and concavely curved, a flange extended portion 152 connected to the flange base 151 and extending substantially in the radially outer direction, and a flange curved portion 153 stepped from a radial outer end of the flange extended portion 152 in the axial direction.

The sealing apparatus 100 includes an outer supporter 60, an inner supporter 70 and a sealing member 80.

The outer supporter 60 includes a first cylindrical portion 61, a first sealing portion 62, a second sealing portion 63, a flange contact portion 64, a connecting portion 65 and a second cylindrical portion 66.

The first cylindrical portion 61 is spaced apart from the other surface of the flange 15 and extends in an axially inboard direction.

The first sealing portion 62 extends from the end of the first cylindrical portion 61 in the radially inner direction, and the second sealing portion 63 extends from a radially inner end of the first sealing portion 62 in an axially outboard direction and contacts with the other surface of the flange 15. When being projected in the axial direction, the first sealing portion 62 and the second sealing portion 63 are overlapped with the flange curved portion 153. Therefore, a volume of a staying recess 110 formed by the first sealing portion 62, the second sealing portion 63, the flange curved portion 153 and the flange extended portion 152 increases, and foreign materials falling down on the other surface of the flange 15 are temporarily stored in the staying recess 110. The foreign materials temporarily stored in the staying recess 110 fall down along an exterior circumference of the outer supporter 60 by gravity or are dropped due to rotation of the hub 10, and is removed from the wheel bearing 1.

The flange contact portion 64 is bent and extends in the radially inner direction from an end of the second sealing portion 63, and contacts with the other surface of the flange 15. Adhesive may be sprayed on the flange contact portion 64 and the other surface of the flange 15 such that the foreign materials falling down on the other surface of the flange 15 are prevented from flowing into a gap between the flange contact portion 64 and the other space of the flange 15.

The connecting portion 65 is slanted in the radially inner direction and the axially inboard direction from a radial inner end of the flange contact portion 64. Since the connecting portion 65 is slanted and spaced apart from the hub 10, a space between the outer supporter 60 and the inner supporter 70 is narrow and inflow of the foreign materials into the sealing apparatus 100 may be effectively prevented. In addition, a curving process of the connecting portion 65 so as to contact the connecting portion 65 with the hub 10 may be omitted, and deformation of the flange contact portion 64 and the second cylindrical portion 66 contacting respectively with the flange 15 and the hub 10 when mounting the outer supporter 60 may be absorbed to some degree. Furthermore, a space between the connecting portion 65 and the flange base 151 may be filled with sealant or adhesive. In this case, the sealant or the adhesive completely prevent inflow of the foreign materials into a gap between the outer supporter 60 and the flange 15.

The second cylindrical portion 66 extends in the axially inboard direction from the other end of the connecting portion 65 and contacts with the exterior circumference of the hub 10. The second cylindrical portion 66 may be press-fitted onto the exterior circumference of the hub 10.

The inner supporter 70 includes an axially extending portion 71, a first radially extending portion 72, a slanted portion 73 and a second radially extending portion 74. In addition, the outer ring 12 includes a small diameter portion 121, a transient portion 122, and a large diameter portion 123. The small diameter portion 121 is formed on an exterior circumference of the end portion of the outer ring 12, the transient portion 122 is connected to the small diameter portion 121 and has an increasing diameter toward the axially inboard direction, and the large diameter portion 123 is connected to the transient portion 122.

The axially extending portion 71 is press-fitted onto the exterior circumference of the end portion of the outer ring 12 and extends in the axial direction. The axially extending portion 71 may be press-fitted onto the small diameter portion 121 of the outer ring 12. The other end of the axially extending portion 71 includes a thin end portion 71a having a decreasing thickness. The thin end portion 71a is slanted in the radially inner direction and the axially outboard direction, and a part of the thin end portion 71a is spaced apart from the exterior circumference of the outer ring 12. Since at least a part of the thin end portion 71a is enclosed by the sealing member 80 when molding the sealing member 80, the sealing member 80 is prevented from being detached from the inner supporter 70. In addition, when the inner supporter 70 is press-fitted onto the exterior circumference of the outer ring 12, a part of the sealing member 80 gets between the thin end portion 71a and the exterior circumference of the outer ring 12. Therefore, the inner supporter 70 may be prevented from leaving the outer ring.

The first radially extending portion 72 is bent toward the radially inner direction from the end of the axially extending portion 71 and contacts with the end portion of the outer ring 12. A radial inner end of the first radially extending portion 72 may be positioned at a region radially more inner than an interior circumference of the end portion of the outer ring 12. Therefore, a space for positioning the slanted portion 73 without interference with the interior circumference of the outer ring 12 is secured.

The slanted portion 73 extends from a radially inner end of the first radially extending portion 72 in the radially inner direction and the axial inboard direction, and the second radially extending portion 74 extends from a radially inner end of the slanted portion 73 in the radially inner direction.

The sealing member 80 encloses at least a part of an exterior circumference of the axially extending portion 71, the first radially extending portion 72, the slanted portion 73, and the second radially extending portion 74. The sealing member 80 may be made of a rubber or a similar material thereto. The transient portion 122 defines an inboard boundary of the sealing member 80 in the axial direction.

The sealing member 80 includes a blocking wall 81 and an extended portion 82. The blocking wall 81 is spaced apart from the first cylindrical portion 61 toward the axially inboard direction, and has a shape enclosing the axially extending portion 71 and thin end portion 71a. The side portion of the blocking wall 81 extends in the radially outer direction more than the first cylindrical portion 61. Since the blocking wall 81 extends in the radially outer direction, inflow of foreign materials from an axial inboard side may be effectively prevented. In addition, the other side portion of the blocking wall 81 is formed of a slanted surface 85 that is slanted in the radially inner direction and the axial inboard direction. Since the blocking wall 81 extends in the radially outer direction and thus is easily deformed, as shown in FIG. 2, the blocking wall 81 is formed to be thick in the axial direction. Since the slanted surface 85 is formed at the other side portion of the blocking wall 81, however, a volume of the blocking wall 81 may be reduced and manufacturing cost may be curtailed. In addition, the foreign materials coming from the axially inboard side are bumped and bounced against the blocking wall 81, or climb over the blocking wall 81 and drop on the exterior circumference of the first cylindrical portion 61. Therefore, the foreign materials moving in the axial direction may be prevented from flowing into the sealing member 80 through a space between the blocking wall 81 and the first cylindrical portion 61. Therefore, the blocking wall 81 may have a suitable radial height.

It is exemplified in this specification and the drawings but is not limited that the slanted surface 85 is formed at the other side portion of the blocking wall 81. It is to be understood that the present invention is intended to cover a perpendicular surface or a curved surface formed at the other side portion of the blocking wall 81.

The extended portion 82 encloses the second radially extending portion 74 at a radially inner end of the sealing member 80 and prevents the sealing member 80 from being detached from the inner supporter 70.

The sealing member 80 includes a lip portion 90 including at least one seal lip 92. Since the seal lip 92 contacts with the other side surface of the outer supporter 60, inflow of foreign materials into the space between the hub 10 and the outer ring 12 may be prevented. At least one seal lip 92 may be prevented, and the number of the seal lips 92 may be selected by a designer depending on target sealing performance. It is exemplified in an exemplary embodiment of the present invention but is not limited that the sealing apparatus 100 includes one seal lip 92. As shown in FIG. 2, if one seal lip 92 contacts with the outer supporter 60, drag torque may be reduced.

The lip portion 90 further includes a pocket lip 91 and a slanted lip 93. The pocket lip 91 has a pocket shape that can trap the foreign materials flowing into the space between the outer supporter 60 and the blocking wall 81. The pocket lip 91 has the pocket shape opening toward the radially outer direction such that the foreign materials flowing into the space between the outer supporter 60 and the inner supporter 70 can be temporarily stored in the pocket lip 91. In addition, an end of the pocket lip 91 is positioned at an axially outboard region more than the first sealing portion 62, and thereby completely trapping the foreign materials flowing into the space between the outer supporter 60 and the inner supporter 70. However, a shape of the pocket lip 91 is not limited to the shape illustrated in FIG. 2.

The foreign materials flowing into the sealing apparatus 100 are trapped by the pocket lip 91, and a part of the trapped foreign materials falls down on an exterior circumference of the pocket lip 91 and flows out from the sealing apparatus 100. In addition, since the end of the pocket lip 91 is positioned close but does not contact with the second sealing portion 63 and the flange contact portion 64, a labyrinth seal is formed therebetween and inflow of the foreign materials into the sealing apparatus 100 can be effectively prevented. If the foreign materials are not trapped by the pocket lip 91 and flows into the sealing apparatus 100 more than the pocket lip 91, the foreign materials are further blocked by the seal lip 92, fall down on an exterior circumference of the seal lip 92, and flow out from the sealing apparatus 100.

The slanted lip 93 extends from the radially inner end of the inner supporter in the radially inner direction and the axially inboard direction. Therefore, if the lubricant in a space between the outer ring 12 and the hub 10 passes the slanted lip 93 and flows out from the sealing apparatus 100, the slanted lip 93 is straightened in a radial direction by pressure of the lubricant and contacts with the second cylindrical portion 66. Therefore, leakage of the lubricant may be prevented.

Since the pocket lip 91 and the slanted lip 93 are configured not to contact with the outer supporter 60, drag torque may be reduced.

Hereinafter, operation of the sealing structure according to an exemplary embodiment of the present invention will be described in detail.

The foreign materials falling down on the other surface of the flange 15 are trapped in the staying recess 110 formed by the flange 15 and the first and second sealing portions 62 and 63. The trapped foreign materials fall down on the exterior circumference of the second sealing portion 63 or are dropped down to the ground due to rotation of the hub 10.

In addition, the foreign materials coming from the axially inboard side are bumped and bounced against the blocking wall 81, or climb over the blocking wall 81 and drop on the exterior circumference of the first cylindrical portion 61. The foreign materials dropping on the exterior circumference of the first cylindrical portion 61 fall down on the exterior circumference of the first cylindrical portion 61 or are trapped in the staying recess 110 and are removed.

In addition, since the outer supporter 60, the inner supporter 70 and the sealing member 80 form the labyrinth seal, inflow of the foreign materials into the sealing apparatus 100 may be further prevented.

In addition, the foreign materials flowing into the sealing apparatus 100 through the space between the outer supporter 60 and the inner supporter 70 are trapped by the pocket lip 91 and are removed from the sealing apparatus 100. Furthermore, the foreign materials that are not removed by the pocket lip 91 are blocked by the seal lip 92 and cannot flow into the sealing apparatus 100.

Hereinafter, referring to FIG. 3 to FIG. 6, sealing structures of a wheel bearing according to exemplary embodiments of the present invention will be described in detail. Since the sealing structures of a wheel bearing according to exemplary embodiments of the present invention are similar to that the sealing structure according to the exemplary embodiment of the present invention, differences therebetween will be mainly described.

Figure 3:
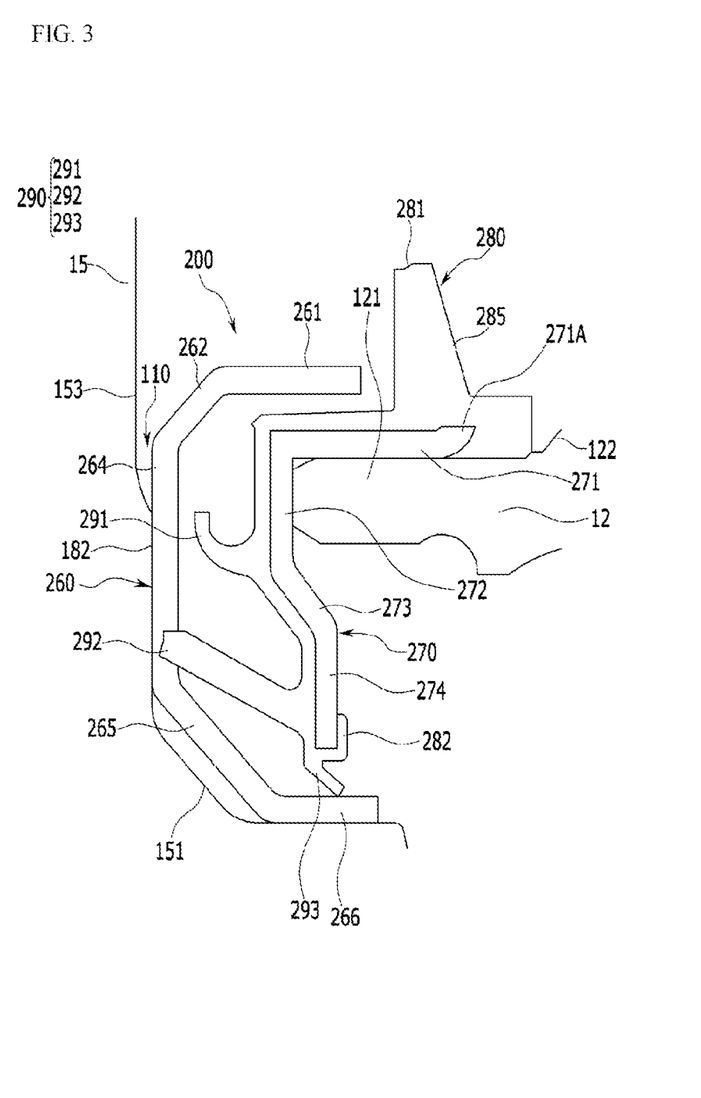
FIG. 3 is a cross-sectional view of a sealing structure of a wheel bearing according to another exemplary embodiment of the present invention.

FIG. 3 is a cross-sectional view of a sealing structure of a wheel bearing according to another exemplary embodiment of the present invention.

As shown in FIG. 3, a sealing apparatus 200 of a wheel bearing according to another exemplary embodiment of the present invention includes an outer supporter 260, an inner supporter 270 and a sealing member 280.

The outer supporter 260 includes a first cylindrical portion 261, a first sealing portion 262, a flange contact portion 264, a connecting portion 265 and a second cylindrical portion 266.

The first cylindrical portion 261 is spaced apart from the other surface of the flange 15 and extends in an axially inboard direction.

The first sealing portion 262 extends from the end of the first cylindrical portion 261 in the radially inner direction and the axial outboard direction. A radially inner end of the first sealing portion 262 is positioned at a region radially more outer than the flange curved portion 153.

The flange contact portion 264 is bent and extends in the radially inner direction from an end of the first sealing portion 262, and contacts with the other surface of the flange 15. At least a part of the flange contact portion 264 is spaced apart from the other surface of the flange 15. Therefore, the staying recess 110 is formed by the first sealing portion 262, the flange contact portion 264 and the flange curved portion 153.

The connecting portion 265 is slanted in the radially inner direction and the axially inboard direction from a radial inner end of the flange contact portion 264.

The second cylindrical portion 266 extends in the axially inboard direction from the other end of the connecting portion 265 and contacts with the exterior circumference of the hub 10.

The inner supporter 270 includes an axially extending portion 271, a first radially extending portion 272, a slanted portion 273 and a second radially extending portion 274.

The sealing member 280 encloses at least a part of an exterior circumference of the axially extending portion 271, the first radially extending portion 272, the slanted portion 273, and the second radially extending portion 274.

The sealing member 280 includes a blocking wall 281 and an extended portion 282. The blocking wall 281 is spaced apart from the first cylindrical portion 261 toward the axially inboard direction, and the side portion of the blocking wall 281 extends in the radially outer direction more than the first cylindrical portion 261. The other side portion of the blocking wall 281 is formed of a slanted surface 285 that is slanted in the radially inner direction and the axial inboard direction.

The sealing member 280 includes a lip portion 290 including at least one seal lip 292. Since the seal lip 292 contacts with the other side surface of the outer supporter 260, inflow of foreign materials into the space between the hub 10 and the outer ring 12 may be prevented.

The lip portion 290 further includes a pocket lip 291 and a slanted lip 293. The pocket lip 291 has a pocket shape that can trap the foreign materials flowing into the space between the outer supporter 260 and the blocking wall 281. Since an end of the pocket lip 291 is positioned close to the flange contact portion 264, a labyrinth seal is formed. Therefore, inflow of the foreign materials into the sealing apparatus 200 may be effectively prevented.

The slanted lip 293 extends from the radially inner end of the inner supporter in the radially inner direction and the axially inboard direction.

Since the pocket lip 291 and the slanted lip 293 are configured not to contact with the outer supporter 260, drag torque may be reduced.

Figure 4:
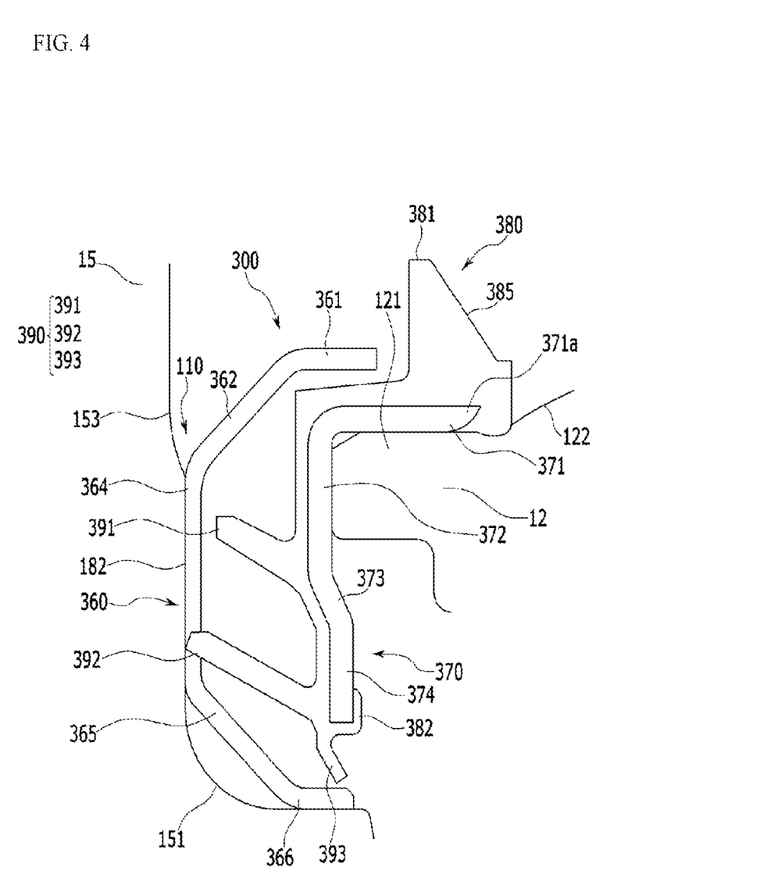
FIG. 4 is a cross-sectional view of a sealing structure of a wheel bearing according to other exemplary embodiment of the present invention.

FIG. 4 is a cross-sectional view of a sealing structure of a wheel bearing according to other exemplary embodiment of the present invention.

As shown in FIG. 4, a sealing apparatus 300 of a wheel bearing according to other exemplary embodiment of the present invention includes an outer supporter 360, an inner supporter 370 and a sealing member 380.

The outer supporter 360 includes a first cylindrical portion 361, a first sealing portion 362, a flange contact portion 364, a connecting portion 365 and a second cylindrical portion 366.

The first cylindrical portion 361 is spaced apart from the other surface of the flange 15 and extends in an axially inboard direction.

The first sealing portion 362 extends from the end of the first cylindrical portion 361 in the radially inner direction and the axial outboard direction. When being projected in the axial direction, the first sealing portion 362 is overlapped with the flange curved portion 153. Therefore, the first sealing portion 362 and the flange curved portion 153 form a staying recess 110.

The flange contact portion 364 is bent and extends in the radially inner direction from an end of the first sealing portion 362, and contacts with the other surface of the flange 15.

The connecting portion 365 is slanted in the radially inner direction and the axially inboard direction from a radial inner end of the flange contact portion 364.

The second cylindrical portion 366 extends in the axially inboard direction from the other end of the connecting portion 365 and contacts with the exterior circumference of the hub 10.

The inner supporter 370 includes an axially extending portion 371, a first radially extending portion 372, a slanted portion 373 and a second radially extending portion 374.

The sealing member 380 encloses at least a part of an exterior circumference of the axially extending portion 371, the first radially extending portion 372, the slanted portion 373, and the second radially extending portion 374.

The sealing member 380 includes a blocking wall 381 and an extended portion 382. The blocking wall 381 is spaced apart from the first cylindrical portion 361 toward the axially inboard direction, and the side portion of the blocking wall 381 extends in the radially outer direction more than the first cylindrical portion 361. The other side portion of the blocking wall 381 is formed of a slanted surface 385 that is slanted in the radially inner direction and the axial inboard direction.

The sealing member 380 includes a lip portion 390 including at least one seal lip 392. Since the seal lip 392 contacts with the other side surface of the outer supporter 360, inflow of foreign materials into the space between the hub 10 and the outer ring 12 may be prevented.

The lip portion 390 further includes a pocket lip 391 and a slanted lip 393. The pocket lip 391 is configured to trap the foreign materials flowing into the space between the outer supporter 360 and the blocking wall 381. In FIG. 4, the pocket lip 391 is slanted in the radially outer direction and the axially outboard direction. An end of the pocket lip 391 is positioned close to the flange contact portion 364 so as to form a labyrinth seal therebetween. Therefore, inflow of the foreign materials into the sealing apparatus 300 may be effectively prevented.

Since the pocket lip 391 and the slanted lip 393 are configured not to contact with the outer supporter 360, drag torque may be reduced.

Figure 5:
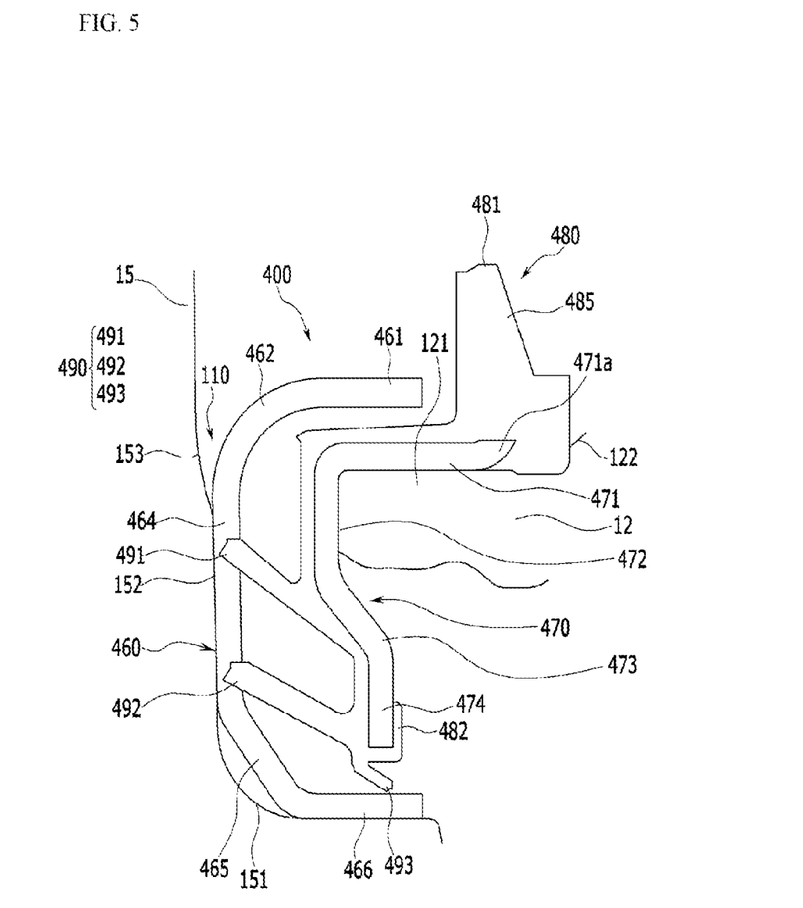
FIG. 5 is a cross-sectional view of a sealing structure of a wheel bearing according to other exemplary embodiment of the present invention.

FIG. 5 is a cross-sectional view of a sealing structure of a wheel bearing according to other exemplary embodiment of the present invention.

As shown in FIG. 5, a sealing apparatus 400 of a wheel bearing according to other exemplary embodiment of the present invention includes an outer supporter 460, an inner supporter 470 and a sealing member 480.

The outer supporter 460 includes a first cylindrical portion 461, a first sealing portion 462, a flange contact portion 464, a connecting portion 465 and a second cylindrical portion 466.

The first cylindrical portion 461 is spaced apart from the other surface of the flange 15 and extends in an axially inboard direction.

The first sealing portion 462 is curved from the end of the first cylindrical portion 461 in the radially inner direction and the axial outboard direction. When being projected in the axial direction, the first sealing portion 462 is overlapped with the flange curved portion 153. Therefore, the first sealing portion 462 and the flange curved portion 153 form a staying recess 110.

The flange contact portion 464 is bent and extends in the radially inner direction from an end of the first sealing portion 462, and contacts with the other surface of the flange 15.

The connecting portion 465 is slanted in the radially inner direction and the axially inboard direction from a radial inner end of the flange contact portion 464.

The second cylindrical portion 466 extends in the axially inboard direction from the other end of the connecting portion 465 and contacts with the exterior circumference of the hub 10.

The inner supporter 470 includes an axially extending portion 471, a first radially extending portion 472, a slanted portion 473 and a second radially extending portion 474.

The sealing member 480 encloses at least a part of an exterior circumference of the axially extending portion 471, the first radially extending portion 472, the slanted portion 473, and the second radially extending portion 474.

The sealing member 480 includes a blocking wall 481 and an extended portion 482. The blocking wall 481 is spaced apart from the first cylindrical portion 461 toward the axially inboard direction, and the side portion of the blocking wall 481 extends in the radially outer direction more than the first cylindrical portion 461. The other side portion of the blocking wall 481 is formed of a slanted surface 485 that is slanted in the radially inner direction and the axial inboard direction.

The sealing member 480 includes a lip portion 490 including at least one seal lip 492. Since the seal lip 492 contacts with the other side surface of the outer supporter 460, inflow of foreign materials into the space between the hub 10 and the outer ring 12 may be prevented.

The lip portion 490 further includes a pocket lip 491 and a slanted lip 493. The pocket lip 491 is configured to trap the foreign materials flowing into the space between the outer supporter 460 and the blocking wall 481. In FIG. 5, the pocket lip 491 is slanted in the radially outer direction and the axially outboard direction and contacts with the flange contact portion 464. Therefore, inflow of the foreign materials may be further prevented while increasing drag torque.

Since the slanted lip 493 is configured not to contact with the outer supporter 460, drag torque may be reduced.

Figure 6:
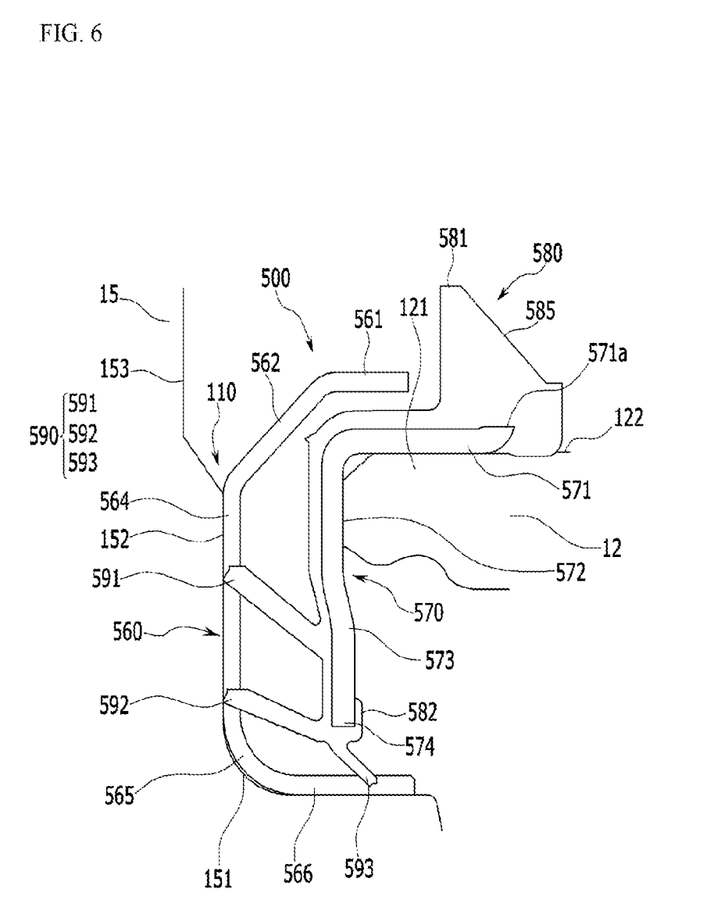
FIG. 6 is a cross-sectional view of a sealing structure of a wheel bearing according to other exemplary embodiment of the present invention.

FIG. 6 is a cross-sectional view of a sealing structure of a wheel bearing according to other exemplary embodiment of the present invention.

As shown in FIG. 6, a sealing apparatus 500 of a wheel bearing according to other exemplary embodiment of the present invention includes an outer supporter 560, an inner supporter 570 and a sealing member 580.

The outer supporter 560 includes a first cylindrical portion 561, a first sealing portion 562, a flange contact portion 564, a connecting portion 565 and a second cylindrical portion 566.

The first cylindrical portion 561 is spaced apart from the other surface of the flange 15 and extends in an axially inboard direction.

The first sealing portion 562 is slanted from the end of the first cylindrical portion 561 in the radially inner direction and the axial outboard direction. When being projected in the axial direction, the first sealing portion 562 is overlapped with the flange curved portion 153. Therefore, the first sealing portion 562 and the flange curved portion 153 form a staying recess 110.

The flange contact portion 564 is bent and extends in the radially inner direction from an end of the first sealing portion 562, and contacts with the other surface of the flange 15.

The connecting portion 565 is slanted in the radially inner direction and the axially inboard direction from a radial inner end of the flange contact portion 564. The connecting portion 565 may contact with the flange base 151 or may be spaced from the flange base 151.

The second cylindrical portion 566 extends in the axially inboard direction from the other end of the connecting portion 565 and contacts with the exterior circumference of the hub 10.

The inner supporter 570 includes an axially extending portion 571, a first radially extending portion 572, a slanted portion 573 and a second radially extending portion 574.

The sealing member 580 encloses at least a part of an exterior circumference of the axially extending portion 571, the first radially extending portion 572, the slanted portion 573, and the second radially extending portion 574.

The sealing member 580 includes a blocking wall 581 and an extended portion 582. The blocking wall 581 is spaced apart from the first cylindrical portion 561 toward the axially inboard direction, and the side portion of the blocking wall 581 extends in the radially outer direction more than the first cylindrical portion 561. The other side portion of the blocking wall 581 is formed of a slanted surface 585 that is slanted in the radially inner direction and the axial inboard direction.

The sealing member 580 includes a lip portion 590 including at least one seal lip 592. Since the seal lip 592 contacts with the other side surface of the outer supporter 560, inflow of foreign materials into the space between the hub 10 and the outer ring 12 may be prevented.

The lip portion 590 further includes a pocket lip 591 and a slanted lip 593. The pocket lip 591 is configured to trap the foreign materials flowing into the space between the outer supporter 560 and the blocking wall 581. In FIG. 6, the pocket lip 591 is slanted in the radially outer direction and the axially outboard direction and contacts with the flange contact portion 564. Therefore, inflow of the foreign materials may be further prevented while increasing drag torque.

Since the slanted lip 593 is configured to contact with the outer supporter 560, grease in the wheel bearing may not be leaked.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure of a wheel bearing which comprises a hub provided with a flange and an outer ring having an end close to the flange and the other end opposite to the end and relatively rotatable to the hub, the sealing structure configured to seal a space between the flange and the end of the outer ring and comprising,
    an inner supporter mounted at an end portion of the outer ring;
    an outer supporter having a flange contact portion mounted at a side surface of the flange; and
    a sealing member mounted on the inner supporter and having at least one seal lip contacting with the outer supporter,
    wherein at least a portion of the outer supporter at a radial exterior of the flange contact portion is spaced from the flange, forms a staying recess together with the flange, and is extended axially away from the flange so as to cover at least a portion of the outer ring radially outwardly,
    wherein the sealing member comprises a blocking wall spaced from an end of the portion of the outer supporter at the radial exterior of the flange contact portion so that an entry of a flow path disposed between the outer supporter and the sealing member is formed between the blocking wall and the end of the portion of the outer supporter at the radial exterior of the flange contact portion, and
    wherein the blocking wall is extended radially further than the end of the portion of the outer supporter at the radial exterior of the flange contact portion so that the entry of a flow path is opened radially outwardly.

2. The sealing structure of claim 1, wherein a surface of the blocking wall opposite to the end of the outer supporter is formed of a slanted surface.

3. The sealing structure of claim 1, wherein at least a portion of the outer supporter at a radial interior of the flange contact portion is spaced from the flange and is extended in an axially inboard direction and a radially inner direction.

4. The sealing structure of claim 1, further comprising a pocket lip extended from the sealing member and having a pocket shape opening toward a radially outer direction.

5. The sealing structure of claim 4, wherein an end of the pocket lip is spaced from the outer supporter.

6. The sealing structure of claim 1, further comprising a pocket lip extended slantly from the sealing member in a radially outer direction and contacting with the outer supporter.

7. The sealing structure of claim 1, wherein the inner supporter comprises:
    an axially extending portion press-fitted onto an exterior circumference of an end portion of the outer ring and extending axially;
    a radially extending portion bent from an end of the axially extending portion, extending in a radially inner direction, and contacting with the end of the outer ring, and
    wherein the other end of the axially extending portion is spaced from an exterior circumference of the outer ring and is formed of a thin end portion.

8. The sealing structure of claim 1, further comprising a slanted lip mounted at a radially inner end of the inner supporter and extending in a radially inner direction and an axially inboard direction.

9. The sealing structure of claim 1, wherein the sealing member further comprises an extended portion enclosing a radially inner end of the inner supporter.

10. A wheel bearing comprising:
    a hub provided with a flange;
    an outer ring having an end close to the flange and the other end opposite to the end and relatively rotatable to the hub; and
    a sealing apparatus configured to seal a space between the flange and the end of the outer ring,
    wherein the flange comprises a flange base, a flange extended portion extended in a radially outer direction from the flange base, and a flange curved portion concave toward an axially outboard direction at a radial exterior of the flange base,
    the sealing apparatus comprises an inner supporter mounted at an end portion of the outer ring, an outer supporter having a flange contact portion, and a sealing member mounted on the inner supporter and having at least one seal lip contacting with the outer supporter, wherein at least a portion of the outer supporter contacts with the flange extended portion, and
    at least a portion of the outer supporter at a radial exterior of the flange contact portion is spaced from the flange curved portion, forms a staying recess together with the flange curved portion, and is extended axially away from the flange so as to cover at least a portion of the outer ring radially outwardly,
    wherein the sealing member includes a blocking wall that is spaced from an end of the portion of the outer supporter at the radial exterior of the flange contact portion so that an entry of a flow path disposed between the outer supporter and the sealing member is formed between the blocking wall and the end of the portion of the outer supporter at the radial exterior of the flange contact portion, and
    wherein the blocking wall is extended radially further than the end of the portion of the outer supporter at the radial exterior of the flange contact portion so that the entry of a flow path is opened radially outwardly.

11. The wheel bearing of claim 10, wherein a surface of the blocking wall opposite to the end of the outer supporter is formed of a slanted surface.

12. The wheel bearing of claim 10, further comprising a pocket lip extended from the sealing member and having a pocket shape opening toward a radially outer direction.

13. The wheel bearing of claim 12, wherein an end of the pocket lip is spaced from the outer supporter.

14. The wheel bearing of claim 10, further comprising a pocket lip extended from the sealing member toward a radially outer direction and contacting with the outer supporter.

* * * * *